US009553781B2

United States Patent
Finkelstein et al.

(10) Patent No.: US 9,553,781 B2
(45) Date of Patent: *Jan. 24, 2017

(54) SERVICE LEVEL AGREEMENT BASED STORAGE ACCESS

(71) Applicant: PayPal, Inc., San Jose, CA (US)

(72) Inventors: Yuri Finkelstein, San Carlos, CA (US); Kumar Rethinakaleeswaran, San Jose, CA (US); John Helm, Los Altos, CA (US); Zheng Peter Xu, Union City, CA (US)

(73) Assignee: PAYPAL, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/922,673

(22) Filed: Oct. 26, 2015

(65) Prior Publication Data
US 2016/0043911 A1    Feb. 11, 2016

Related U.S. Application Data

(63) Continuation of application No. 12/752,028, filed on Mar. 31, 2010, now Pat. No. 9,197,514.

(51) Int. Cl.
| | | |
|---|---|---|
| G06F 17/30 | (2006.01) | |
| H04L 12/24 | (2006.01) | |
| H04L 12/911 | (2013.01) | |
| H04L 29/08 | (2006.01) | |

(52) U.S. Cl.
CPC ..... *H04L 41/5025* (2013.01); *G06F 17/30286* (2013.01); *H04L 41/5009* (2013.01); *H04L 41/5074* (2013.01); *H04L 41/5096* (2013.01); *H04L 47/74* (2013.01); *H04L 67/20* (2013.01)

(58) Field of Classification Search
CPC .......... G06F 17/30286; H04L 41/5009; H04L 41/5025; H04L 51/5074; H04L 41/5096; H04L 47/74; H04L 67/20
See application file for complete search history.

(56) References Cited

U.S. PATENT DOCUMENTS

| | | | |
|---|---|---|---|
| 5,893,905 | A | 4/1999 | Main et al. |
| 7,343,356 | B2 | 3/2008 | Prahlad et al. |
| 7,529,903 | B2 | 5/2009 | Boss et al. |
| 8,051,243 | B2 | 11/2011 | Murase |
| 8,112,585 | B2 | 2/2012 | Patel et al. |
| 9,197,514 | B2 | 11/2015 | Finkelstein et al. |
| 2002/0103005 | A1 | 8/2002 | La Vaughn, Jr. et al. |
| 2002/0169876 | A1 | 11/2002 | Curie et al. |
| 2003/0055972 | A1 | 3/2003 | Fuller et al. |
| 2004/0267916 | A1 | 12/2004 | Chambliss et al. |

(Continued)

OTHER PUBLICATIONS

"U.S. Appl. No. 12/752,028 , Response filed Jan. 17, 2013 to Final Office Action mailed Oct. 17, 2012", 8 pgs.

(Continued)

*Primary Examiner* — Jorge A Casanova
(74) *Attorney, Agent, or Firm* — Maschoff Brennan

(57) ABSTRACT

A method and a system implementing a service level agreement based storage access system. A service level agreement based storage access system presents a single interface for data storage consumers and translates generic data operation requests to data operation request specific to a storage server. The SLA based storage access system also monitors storage server performance and may throttle processes to ensure service level agreements are not violated.

20 Claims, 6 Drawing Sheets

(56) References Cited

U.S. PATENT DOCUMENTS

| | | | |
|---|---|---|---|
| 2005/0038829 A1 | 2/2005 | Chidambaran et al. |
| 2005/0256946 A1 | 11/2005 | Childress et al. |
| 2005/0261933 A1 | 11/2005 | Magnuson |
| 2006/0230245 A1 | 10/2006 | Gounares et al. |
| 2007/0100892 A1 | 5/2007 | Kephart et al. |
| 2008/0114792 A1 | 5/2008 | LaMonica |
| 2008/0177971 A1 | 7/2008 | Prahlad |
| 2009/0119673 A1 | 5/2009 | Bubba |
| 2010/0191908 A1 | 7/2010 | Yamakawa |
| 2011/0246526 A1 | 10/2011 | Finkelstein et al. |
| 2012/0284278 A1 | 11/2012 | Ikegami |

OTHER PUBLICATIONS

"U.S. Appl. No. 12/752,028 Restriction Requirement mailed Feb. 8, 2012", 6 pgs.

"U.S. Appl. No. 12/752,028, Examiner Interview Summary Oct. 9, 2014", 3 pgs.

"U.S. Appl. No. 12/752,028, Examiner Interview Summary mailed Jan. 15, 2013", 3 pgs.

"U.S. Appl. No. 12/752,028, Examiner Interview Summary mailed May 13, 2014", 3 pgs.

"U.S. Appl. No. 12/752,028, Examiner Interview Summary mailed Aug. 28, 2013", 3 pgs.

"U.S. Appl. No. 12/752,028, Final Office Action mailed Jan. 10, 2014", 12 pgs.

"U.S. Appl. No. 12/752,028, Final Office Action mailed Feb. 20, 2015", 7 pgs.

"U.S. Appl. No. 12/752,028, Final Office Action mailed Oct. 17, 2012", 11 pgs.

"U.S. Appl. No. 12/752,028, Non Final Office Action mailed Apr. 4, 2012", 11 pgs.

"U.S. Appl. No. 12/752,028, Non Final Office Action mailed Aug. 12, 2013", 10 pgs.

"U.S. Appl. No. 12/752,028, Non Final Office Action mailed Aug. 25, 2014", 14 pgs.

"U.S. Appl. No. 12/752,028, Notice of Allowance mailed Jul. 24, 2015", 10 pgs.

"U.S. Appl. No. 12/752,028, Response filed Mar. 8, 2012 to Restriction Requirement mailed Feb. 8, 2012", 5 pgs.

"U.S. Appl. No. 12/752,028, Response filed May 12, 2014 to Final Office Action mailed Jan. 10, 2014", 9 pgs.

"U.S. Appl. No. 12/752,028, Response filed Jun. 22, 2015 to Final Office Action mailed Feb. 20, 2015", 7 pgs.

"U.S. Appl. No. 12/752,028, Response filed Sep. 4, 2012 to Non Final Office Action mailed Apr. 4, 2012", 8 pgs.

"U.S. Appl. No. 12/752,028, Response filed Nov. 24, 2014 to Non Final Office Action mailed Aug. 25, 2014", 11 pgs.

"U.S. Appl. No. 12/752,028, Response filed Nov. 12, 2013 to Non Final Office Action mailed Aug. 12, 2013", 9 pgs.

SERVICE LEVEL AGREEMENT BASED STORAGE ACCESS

PRIORITY

This application is a continuation of and claims the benefit of priority under to U.S. patent application Ser. No. 12/752,028 filed Mar. 31, 2010, filed on Mar. 31, 2010, which is hereby incorporated by reference herein in its entirety.

TECHNICAL FIELD

The present application relates generally to the technical field of dynamic information storage and retrieval and, in one specific embodiment, to service level agreement (SLA) based storage access.

BACKGROUND

Applications and users of computer-based systems may generate significant data storage needs. Entities managing such systems may augment their internally-managed storage capacities with storage provided by third party storage vendors. However, third party storage vendors may provide varying levels of service and each may present a proprietary interface. A plurality of proprietary interfaces may present different requirements and may change over time, which complicates building applications and services that depend on the third party storage vendors. Moreover, in prior art implementations, the data storage needs of the applications and users of a system were addressed by manually provisioning a block of storage. This leads to inefficient allocation of storage and requires personnel resources. Dependence on multiple third party storage vendors and local storage may make it difficult to ensure performance requirements, such as enforcing service level agreements of the applications and the users.

DESCRIPTION OF THE DRAWINGS

Some embodiments are illustrated by way of example and not limitation in the figures of the accompanying drawings in which.

DETAILED DESCRIPTION

Figure 1:
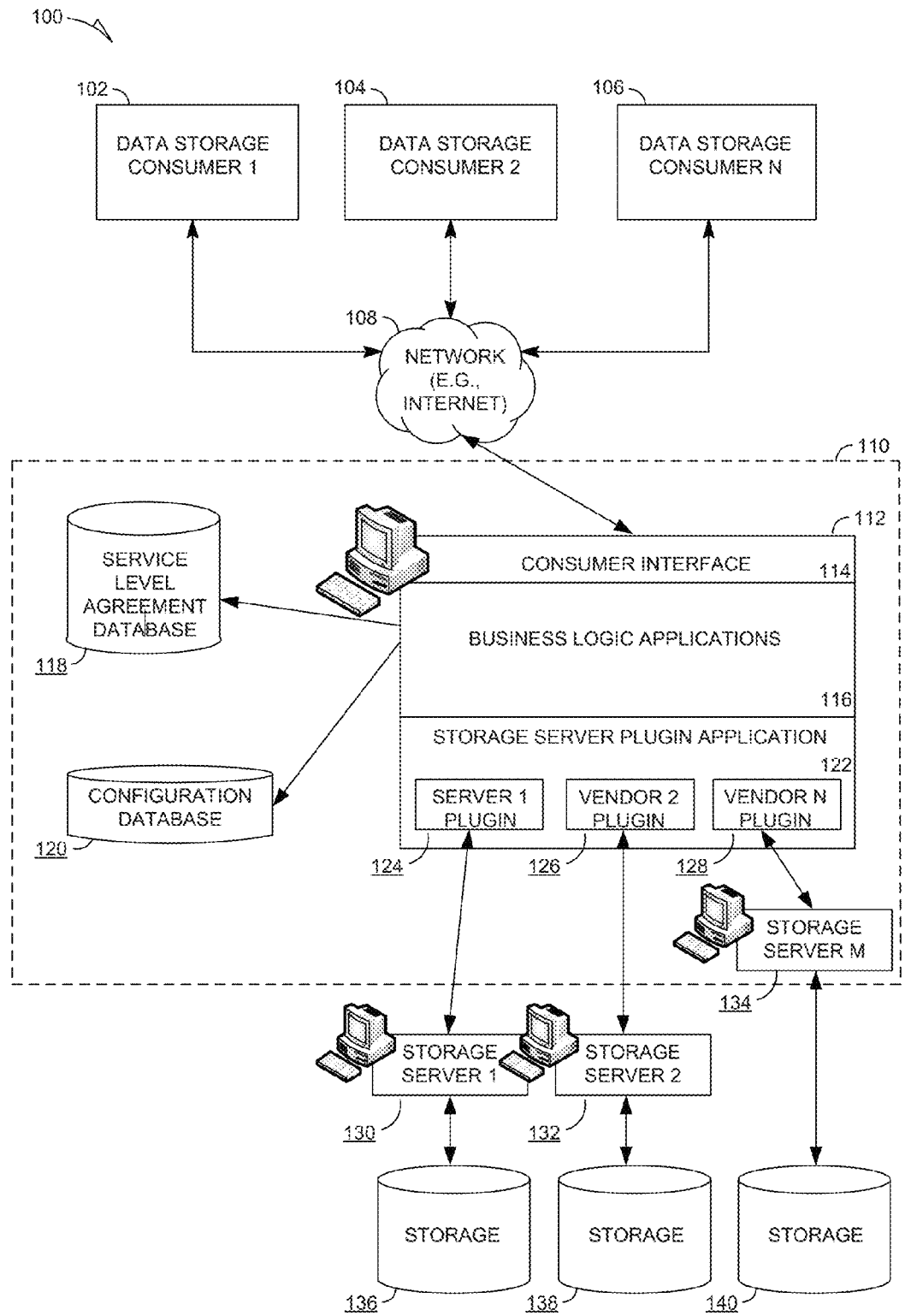
FIG. 1 is a block diagram of a service level agreement based storage access system, according to an example embodiment.

Example methods and systems of an SLA based storage access are described. In the following description, for purposes of explanation, numerous specific details are set forth in order to provide a thorough understanding of example embodiments. It will be evident, however, to one skilled in the art that the present invention may be practiced without these specific details. As used herein, the term "or" may be construed in an inclusive and exclusive sense.

Prior art implementations addressed the storage need of systems that provide storage to applications and users by augmenting their storage capabilities with those provided by third party storage vendors. Such entities manually provisioned blocks of storage to users and applications. Multiple applications and users may be assigned to a third party storage vendor. And in some instances, a user or application may be assigned to utilize storage from multiple third party storage vendors.

In contrast to prior art systems, an example embodiment of the invention provides a service façade, such as web services/a service orientated architecture (SOA) layer, that provides a single consumer interface for users and applications to access storage across multiple storage servers, including those storage servers associated with third party storage vendors and internally managed storage. This consumer interface may allow calls to perform generic data operation requests. Generic data operations include, but are not limited to, instructions to write, read, modify, delete or create data. The SOA layer and supporting business logic may then translate such generic request to a specific data operation request tailored for a specific storage server using a plug-in software component provided for that storage server. In an example embodiment, an SOA layer is a collection of services that may be provided over a network. SOA services may include authentication, messaging, data exchanges and other services. Here, the SOA layer comprises services such as supporting data operation requests and collection of data storage consumer profiles.

An SOA layer, the supporting business logic, and associated hardware, herein known for brevity's sake as an SLA based storage access system, also may provide the infrastructure to automatically provision storage resources based upon user and application needs. A request for storage may be accompanied with, or may follow, a profile of a data storage consumer. A data usage consumer may be, as an example, a user, an application, a programmatic software, or a process. In an example embodiment, the profile may specify requirements such as a minimum or range required for writes per second, reads per second, and data throughput values. Further profile requirements are described in the discussion of FIG. 1. The profile of the data storage consumer may then be matched to a compatible storage server based on the configuration and performance data of the available storage servers. The assignment of the data storage consumer to a storage server may take into account the current load of the storage servers.

In an example embodiment, the SLA based storage access system may also monitor the performance of the storage servers. In an example embodiment, the SLA based storage access system may monitor the performance of the storage servers in regard to SLAs. In a further embodiment, an SLA is an agreement regarding a level of services provided. This may refer to real-time fulfillment of certain system outputs, such as the level of services between a service provider and consumer. Further details regarding the SLAs are found in the discussion of FIG. 1.

Such SLAs may be included in or be derived from the profiles of the data storage consumers. Storage server performance data may be calculated by analyzing the data requested and the delay between the time the SLA based storage access system sends a request to a storage server and receives a response. The SLA based storage access system may throttle and rate limit the performance of some data storage consumers or processes in order to ensure SLAs are not violated. In some cases, the SLA based storage access server may issue an alarm or alert with diagnosis information and recommendations to resolve a potential or actual SLA violation.

FIG. 1 is a block diagram of a service level agreement based storage access environment 100, according to an example embodiment. One or more data storage consumers 102, 104, 106 may communicate with the SLA based storage access system 110. The data storage consumers 102, 104, 106 are represented by data storage consumer 1 (102), data storage consumer 2 (104), and data storage consumer N 106. The data storage consumers 102, 104, 106 represent one or more data storage consumers, up to a variable N number. The data storage consumers 102, 104, 106 communicate with the SLA based storage access system 110 through a network 108. The communication may be a data operation request. A data operation request may be a read, write, modify, create or delete data operation. The data may be unstructured, such as files in a file system, or structured data, such as data stored in a relational database and tables. A network 108 may be, but is not limited to, the Internet, an intranet, a communications network, or a combination of the above. In an example embodiment, the network 108 is the Internet and the data storage consumers utilize an open and widely used protocol to send and receive information. Such protocols may include ISCSI and CIFS. In an example embodiment, the protocol used is HTTP or HTTPS to allow a broad user base to potentially access the SLA based storage access system 110. The use of an open and widely used protocol such as HTTP or HTTPS may also allow third parties, such as affiliated or acquired companies, to access the SLA based storage access system 110. Authentication of third parties may be controlled though services provided by the SOA layer.

The data storage consumer 102, 104, 106 may access the SLA based storage access application 112 through a consumer interface 114. In an example embodiment, the consumer interface 114 is a service façade, such as an SOA layer that represents a single generic interface for all storage needs. The consumer interface 114 may mask to the data storage consumer 102, 104, 106 where or with whom the data will be stored. This implementation may present the SLA based storage access system 110 as cloud-based storage.

The data storage consumer 102, 104, 106 may send a generic data operation request to the consumer interface 114 to access data which may be saved on storage managed by the SLA based storage access application 112. A business logic application 116 will analyze the generic data operation request from the data storage consumers 102, 104, 106 as received by the consumer interface 114. The business logic application 116 may query a configuration database 120 to determine what storage server 130, 132, 134 has provisioned storage for the data storage consumer 102, 104, 106. There may be one or more storage servers 130, 132, 134, up to a variable M number. The data storage consumer 102, 104, 106 may be associated with and have provisioned storage on one or more storage servers 130, 132, 134. In some cases, the SLA based storage access application 112 can analyze the generic data operation request from the data storage consumer 102, 104, 106 to identify the storage servers 136, 138, 140 relevant to a generic data operation request. In an example embodiment, the storage servers may be internal to the system 134 or hosted by third parties 130, 132.

The SLA based storage access application 112 communicates with the relevant storage servers 130, 132, 134 through a server plug-in 124, 126, 128 associated with the relevant server 130, 132, 134. In an example embodiment, a single server plug-in 124 is associated with one storage server 130. In another example embodiment, a plug-in may be associated with one or more storage servers. There should exist at least enough plug-ins to translate a generic request to a specific request understood by any of the storage servers 103, 132, 134. The server plug-in 124, 126, 128 may translate the generic data operation request to a specific request understood by the storage server 130, 132, 134. The storage server 130, 132, 134 may be internal or external to the SLA based storage access application 112, such as local storage or a third party storage vendor. The storage server 130, 132, 134 then communicates with storage 136, 138, 140 that it is associated with to perform the requested data operation. The storage 136, 138, 140 may be one or more physical databases, distributed databases, a single storage node, a plurality of storage nodes, an integrated storage infrastructure, or other systems providing storage. The storage server 130, 132, 134 may then return data to the SLA based storage access system 112 which then communicates the data to the data storage consumer 102, 104, 106.

The SLA based storage access application 112 may also record and calculate storage server performance data and SLA performance data on the service level agreement database 118. The service level agreement database 118 may save information regarding requested data operations, the data requested, and other SLA performance data, such as reads and writes per second, and other metrics described below. The service level agreement database 118 or the SLA based storage access system 112 may also store information regarding the current system load of the storage servers 130, 132, 134. The SLA performance data may be calculated from the data operations requested by the data storage consumer 102, 104, 106 and the time it takes for the storage server 130, 132, 134 to respond.

The configuration database 120 may store, but is not limited to storing, information regarding the data storage consumer 102, 104, 106 and the storage servers 130, 132, 134. The data storage consumer 102, 104, 106 may communicate through the network 108 and through the consumer interface 114 a data storage consumer profile to the SLA based storage application 112. The profile may include various data storage requirements, including service level agreement data. The profile may include information regarding requirements and SLAs that include, but are not limited to, a minimum or required range of performance for read and write latency and read and write throughput. The read and write latencies may be calculated by assuming an operation on a nominal piece of data and the time between a read/write operation request and a response. Read and write throughput may calculate the number of read/write operations per second. The profile may also contain data storage requirement information on data reliability, including a minimum or required number of replicas. Data may also be governed by a purging policy that defines when data may be considered stale and subject to deletion or archiving, the policy which may be described in the profile. The profile may also indicate the security needs of the data storage consumer 102, 104, 106, such as whether the data may be stored with non-secure data, whether it requires its own namespace, whether it must be stored in a highly secure location, or other levels of security.

The configuration database 120 may store information regarding the storage servers 130, 132, 134, such as, but not limited to, their peak or average performance, their potential security offerings, their current capacity, and other data that can be matched to a data storage consumer 102, 104, 106 profile and SLA.

By accessing the configuration database 120 and the service level agreement database 118, the SLA based storage access application 112 may monitor the storage service provided to the data storage consumer 102, 104, 106 in regard to their respective SLAs. By analyzing storage server performance data, the SLA based storage application 112 may discover usage trends that will show either a potential or actual violation of an SLA. In response, the SLA based storage application 112 may throttle or limit the access of certain data storage consumers and processes accessing a storage server 130, 132, 134. For example, if two applications run on a single storage server 130, 132, 134 the SLA based storage application 112 may slow the throughput rate of the first application to ensure the second application's SLAs are not violated. Throttling may include, but is not limited to, limiting the read/writes per second, increasing read/write latency or adjusting the level of data reliability. The SLA based storage application 112 may also generate a ticket that will alarm/alert of the potential or actual SLA violation. The ticket may include specific data, such as data regarding what SLA will be or is violated, when the violation did or will likely occur, the contributing factors to the SLA violation, and the impact on the data storage consumers 102, 104, 106 and other dependent parties. The ticket may also include instructions to address the threatened SLA, such as recommending increased storage capacity, more processing power, or other remedial actions.

Figure 2:
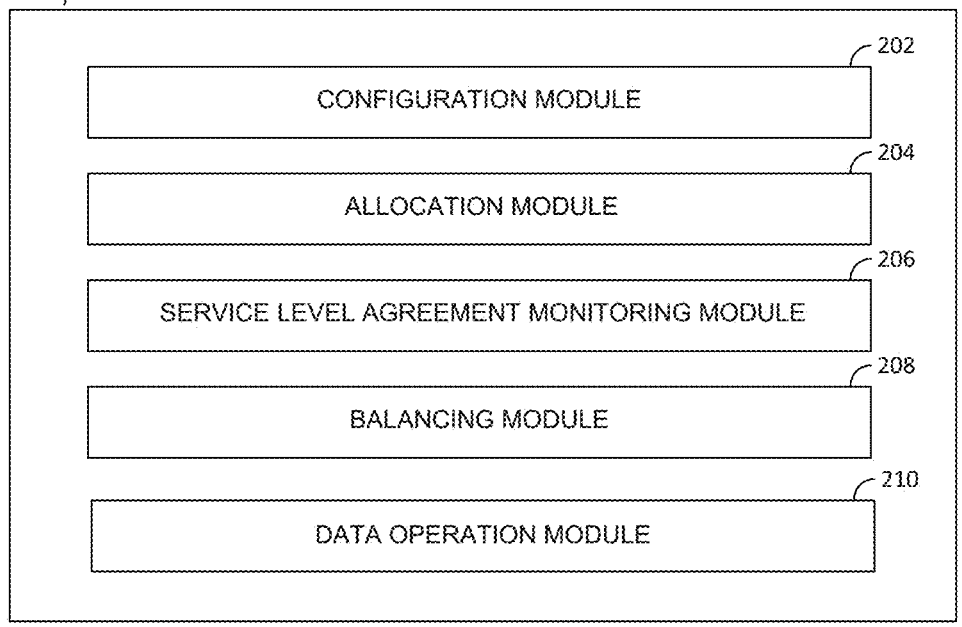
FIG. 2 is a block diagram of the business logic applications of a service level agreement based storage access system, according to an example embodiment.

FIG. 2 is a block diagram of the business logic applications of a service level agreement based storage access system, according to an example embodiment. The business logic applications 116 are business logic that support the functionality of the SLA based storage access system. The business logic applications 116 include, but are not limited to, a configuration module 202, allocation module 204, a service level agreement monitoring module 206, a balancing module 208, and a data operation module 210. The configuration module 202 receives configuration data. In an example embodiment, the configuration module 202 may receive configuration data regarding data storage consumers in the form of a profile. The configuration module 202 may also receive configuration data regarding the storage servers and their associated capacities. Configuration data may include the profiles of the data storage consumer, their SLAs, projected data use, and other data. It may also include the performance and capacity of the storage servers and storage. The configuration data may be dynamic and reflect the current capacity of storage servers and storage. The configuration module 202 may store the received configuration data in a configuration database. The configuration module 202 may update or access configuration data on the configuration database.

The allocation module 204 analyzes the profiles and the configuration data of the data storage consumers and compares it against the configuration data of the storage servers, and other external factors, such as server load, to determine which storage server will allocate storage to the data storage consumer. The allocation module 204 may analyze factors such as, but not limited to, the ability of the storage server to meet the data storage consumer's SLA, privacy demands, and other factors. Allocation data, such as which storage server allocated storage to which data storage consumer, may be saved in the configuration database.

The service level agreement monitoring module 206 may monitor the storage server performance data and compare it against the SLAs of the data storage consumers accessing the storage server. If the service level agreement monitoring module 206 identifies a potential or actual SLA violation, it may call upon the balancing module 208 to balance the load on the storage server by throttling or limiting the rate of access of one application on the storage server in order to maintain the SLA of another data storage consumer on the same storage server. Thus, the balancing module 208 seeks to dynamically ensure that the SLAs of all the data storage consumers on a storage server are maintained. A potential SLA violation may exist if existing usage trends indicate that an SLA will be violated in a finite amount of time, such as within a week or a day. In an example embodiment, the service level agreement monitoring module 206 may also generate an alert/alarm notifying of the potential or actual SLA violation. The alert/alarm may include specific data or instructions. The specific data may be data regarding what SLA will be or is violated, when the violation did or will likely occur, the contributing factors to the SLA violation, and the impact on the data storage consumers and other dependent parties. Instructions may include suggested resolutions, such as the addition of storage capacity or processing capacity or other remedial actions.

The data operation module 210 receives and manages data operation requests. When the data operation module 210 receives a generic data operation request from a data storage consumer it will query the configuration database to determine which storage server has provisioned data to the data storage consumer. The data operation module 210 then communicates the generic data operation request to a plug-in specific to the storage server to translate the generic operation request to a specific request for that storage server. The data operation module 210 will then communicate the specific data operation request to its respective storage server. The data operation module 210 will further communicate the response from the storage server to the data storage consumer.

Figure 3A:
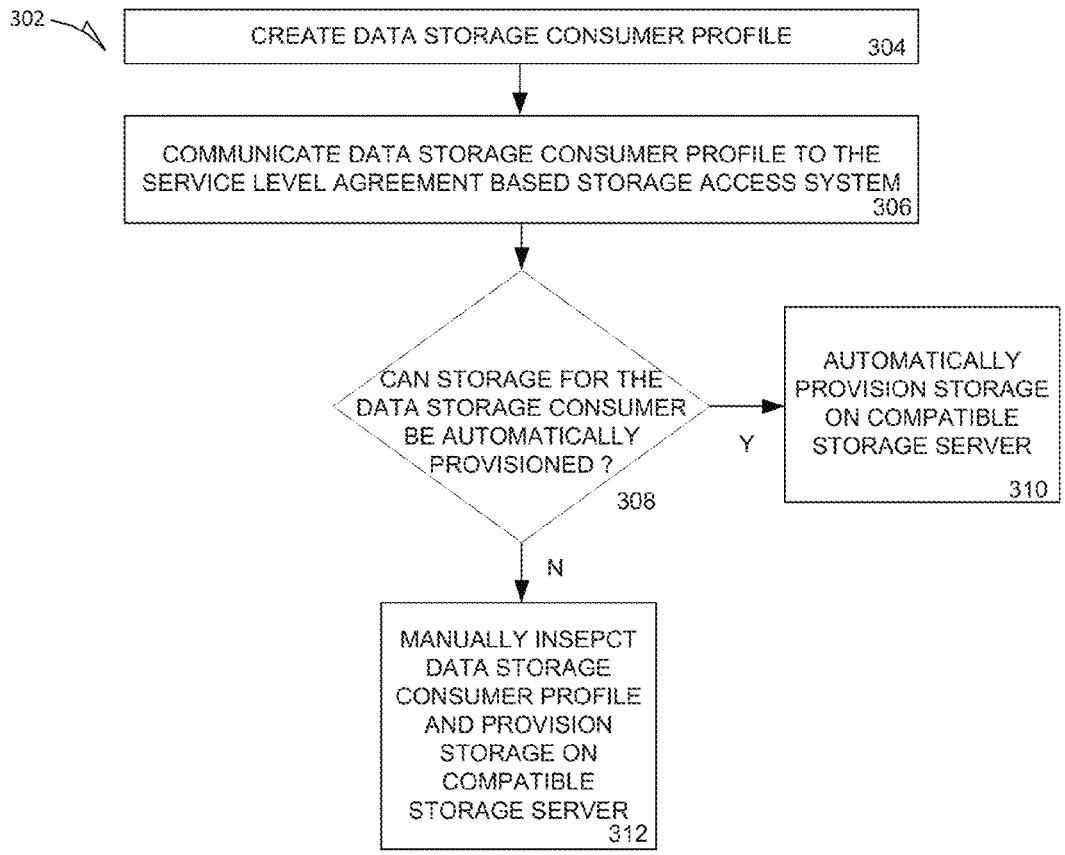
FIG. 3A is a process diagram of operations to provision storage to a data storage consumer, according to an example embodiment.

FIG. 3A is a process diagram of operations to provision storage to a data storage consumer, according to an example embodiment. At operation 304 a data storage consumer profile is created. The profile may be created manually by entering data through a website, such as the SOA layer, or through a ticketing system or through other methods. At operation 306 the profile is communicated to the service level agreement based storage access system. In an example embodiment, the profile may be communicated through the SOA layer or a generic interface. At operation 308, the data storage consumer profile is analyzed against the configuration data of the storage servers to determine if storage can be automatically provisioned. Storage may be automatically provisioned if the requirements listed in the data storage consumer profile match the capacity of a storage server. Storage cannot be automatically provisioned if provisioning the storage requires manual inspection, such as due to special security requirements or location requirements or if there is no proper match. If storage can be automatically provisioned, then at operation 310 the service level agreement based storage access system provisions storage to the data storage consumer that is compatible with its SLA. If the data storage consumer cannot be automatically provisioned storage, then at operation 312 the service level agreement based storage system will wait for manual inspection and provisioning of storage on a storage server for the data storage consumer.

Figure 3B:
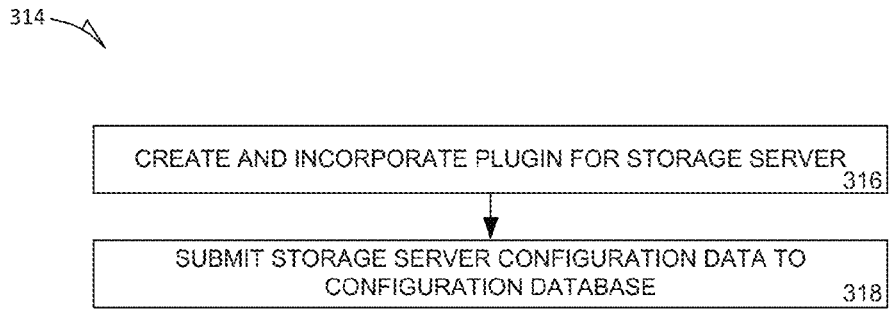
FIG. 3B is a process diagram of operations to on-board a storage server, according to an example embodiment.

FIG. 3B is a process diagram of operations to on-board a storage provider, according to an example embodiment. At operation 316 a plug-in for a storage server is created and incorporated into the service level agreement based storage system. In an example embodiment, the plug-in translates a generic data operation request, as received by the SOA layer, to a data operation request specific to the storage server. At operation 318 configuration data about the storage server is submitted to the configuration data for the service level agreement based storage access system to access later.

Figure 4A:
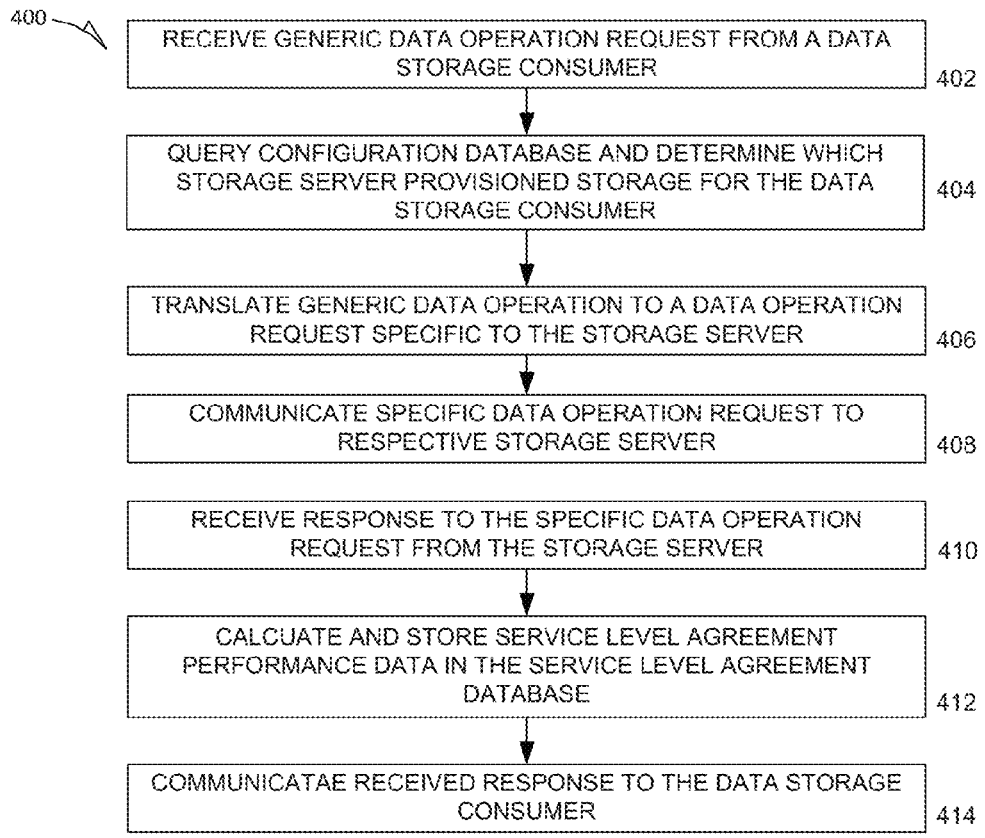
FIG. 4A is a process diagram of operations to process a generic data operation received from a data storage consumer, according to an example embodiment.

FIG. 4A is a process diagram of operations to process a data operation received from a data storage consumer 400, according to an example embodiment. At operation 402 a data storage consumer communicates a generic data operation request to the service level agreement based storage access system. The generic request may be received through a SOA layer. At operation 404 the service level agreement based storage access system queries the configuration database to determine, using the generic data operation request, which storage server has provisioned storage to the data storage consumer. At operation 406 the generic data operation request is translated to a data operation request specific to a storage server by the plug-in for the storage server. At operation 408 the specific data operation request is communicated to the respective storage server. At operation 410 a response to the specific data operation request is received by the service level agreement based storage access system. This response may be requested data or confirmation of a completed operation. At operation 412 service level agreement and storage server performance data is calculated and stored in the service level agreement database. In an example embodiment, the performance data may be calculated by analyzing the data and operations requested and the amount of time between the data operation request and response from the storage server. At operation 414 the data received from the storage servers is communicated to the data storage consumer.

Figure 4B:
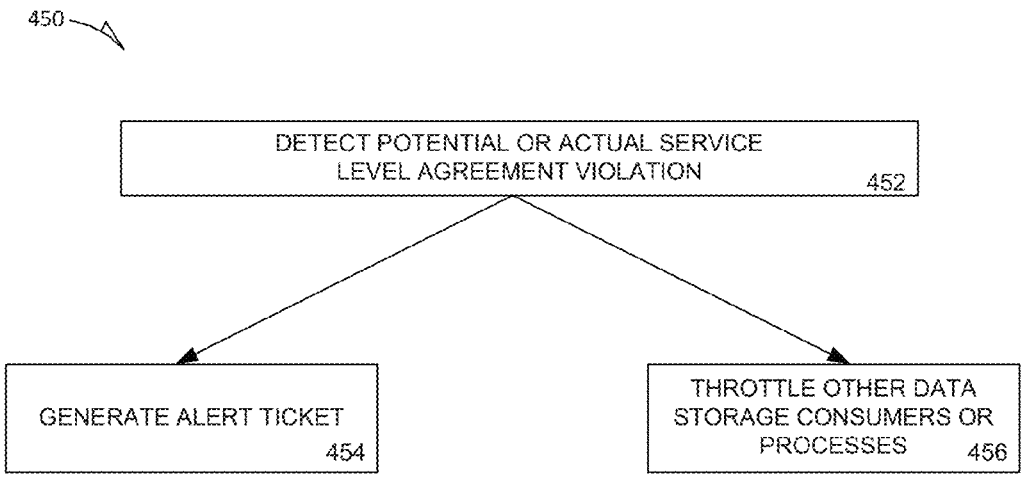
FIG. 4B is a process diagram of operations to maintain service level agreements, according to an example embodiment.

FIG. 4B is a process diagram of operations to maintain service level agreements 450, according to an example embodiment. At operation 452 a potential or actual service level agreement is detected. Upon detection, two actions may be taken. At operation 454 an alert/alarm ticket is generated to notify personnel of an actual or potential service level agreement violation. This alert/alarm may include further details and instructions. Furthermore, at operation 456 the service level agreement based storage access system may throttle or rate limit other processes or data storage consumers on the storage server to ensure that no SLA is violated.

Figure 5:
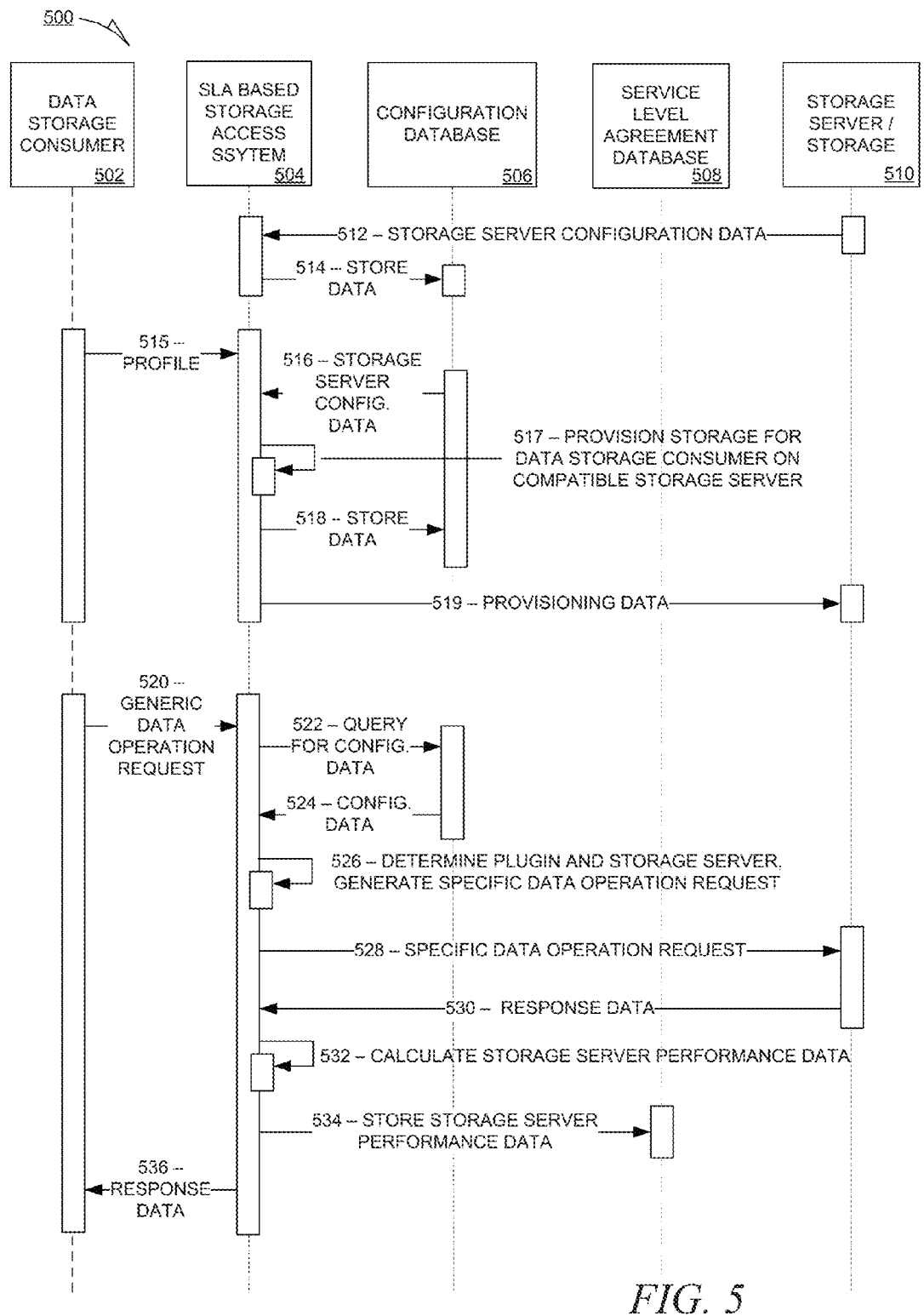
FIG. 5 is an interaction diagram illustrating the process of on-boarding a storage server and a data storage consumer, and processing a generic data operation request, according to an example embodiment.

FIG. 5 is an interaction diagram illustrating the process of on-boarding a storage server and a data storage consumer, and processing a data operation request, according to an example embodiment. The process begins with operation 512, when the SLA based storage access system 504 receives storage server 510 configuration data. The configuration data may include information regarding the capabilities of the storage server and associated storage. At operation 514 the SLA based storage access system 504 then stores the configuration data in the configuration database 506. At a later time, at operation 515 a data storage consumer 502 communicates a profile to the SLA based storage access system 504. At operation 516 the SLA based storage access system 504 receives storage server configuration data for all the storage servers 510 stored on the configuration database 506. Using the data storage consumer profile and the storage server configuration data, at operation 517 the SLA based storage access system 504 provisions storage from a storage server 510 to the data storage consumer 502 that is compatible with the data storage consumer's profile requirements. At operation 518 data regarding the provisioning, such as how much storage was provisioned on what server and the data storage consumer's profile, is stored on the configuration database 506. At operation 519, the SLA based storage access system 504 notifies the storage server 510 of the storage provisioned to the data storage consumer 502.

At operation 520 a data storage consumer 502 communicates a generic data operation request to the SLA based storage access system 504. The SLA based storage access system 504 uses this generic operation request and queries the configuration database 506 at operations 522 and 524 to determine which storage server 510 the data storage consumer 502 is associated with and has provisioned storage on. The identity of the storage server 510 determines which plug-in will translate the generic data operation request, at operation 526, to a specific data operation request tailored for the relevant storage server 510. At operations 528 and 530 the specific data operation request is communicated to the relevant storage server 510 and response data is generated and communicated back to the SLA based storage access system 504. This response data is then communicated to the data storage consumer 502 at operation 536.

Additionally, at operation 532 the SLA based storage access system 504 calculates storage server performance data and saves that performance data on a service level agreement database 508. This data may later be used to generate a potential or actual SLA violation alarm/alert. At operation 534 the storage server performance data is stored on the service level agreement database 508.

Figure 6:
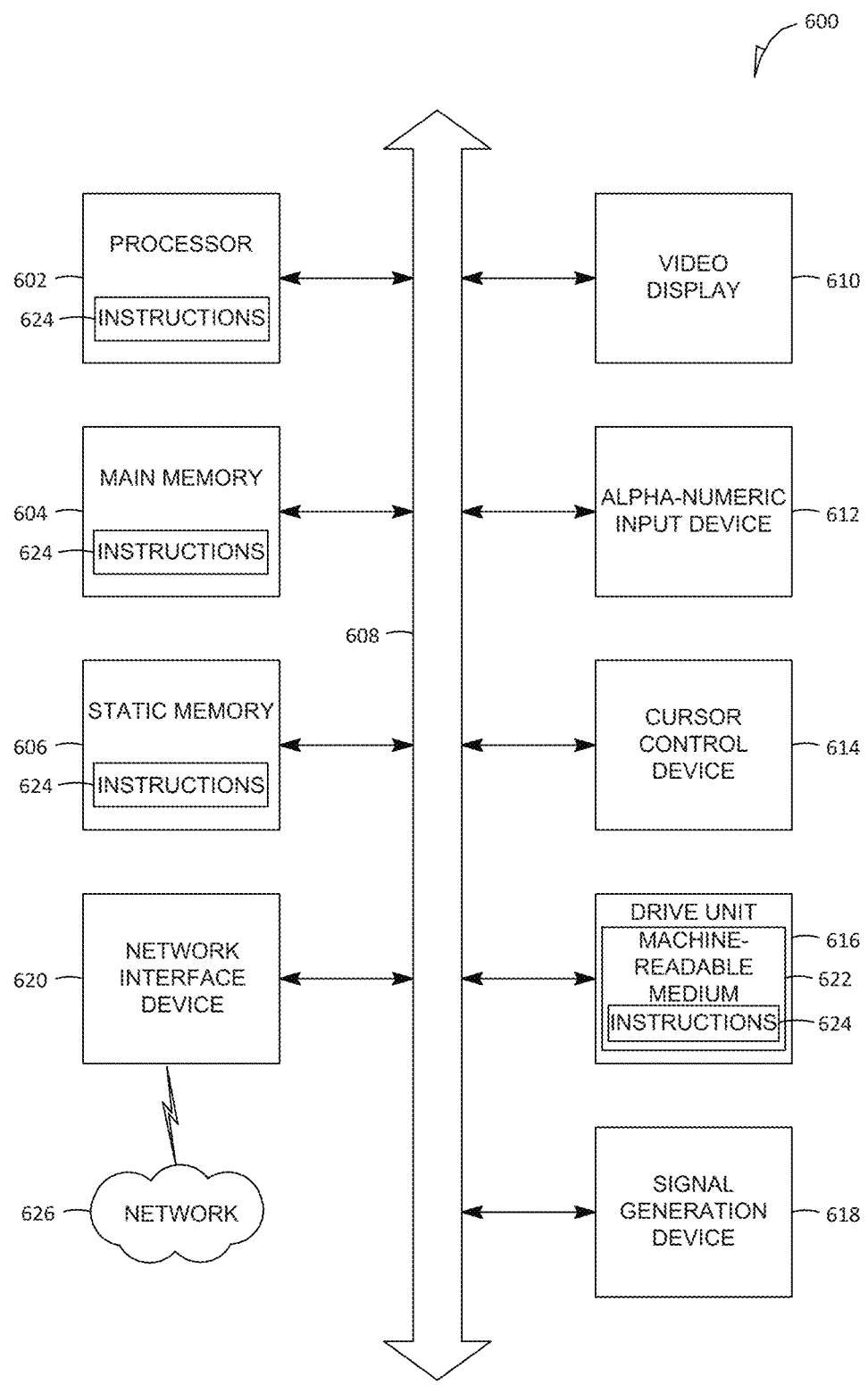
FIG. 6 is a block diagram of a machine in the example form of a computer system within which a set of instructions for causing the machine to perform one or more of the methodologies discussed herein.

FIG. 6 shows a diagrammatic representation of machine in the example form of a computer system 600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU) a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions (e.g., software 624) embodying any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system of a service level agreement based storage access have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    calculating service level agreement performance data, based on a time delay between communicating a request to a storage server and receiving a response from the storage server at a data storage consumer;
    detecting a service level agreement violation of a service level agreement, based on the service level agreement performance data; and
    throttling data storage server resources to maintain the service level agreement of the data storage consumer based on the service level agreement performance data indicating the service level agreement violation.

2. The method of claim 1, further comprising issuing an alert ticket responsive to detecting the service level agreement violation.

3. The method of claim 2, wherein the alert ticket includes an indication of the service level agreement violation and the service level agreement performance data.

4. The method of claim 2, wherein the issuing the alert ticket further comprises:
    causing display of a violation notification at the data storage consumer, the violation notification including an indication of a time when the service level agreement violation occurred.

5. The method of claim 2, wherein the alert ticket indicates an amount and a type of resource to throttle to maintain the service level agreement.

6. The method of claim 5, wherein the alert ticket includes a suggested resolution to prevent the service level agreement violation.

7. The method of claim 1, wherein the throttling the data storage server resources comprises:
    limiting a read per second and a write per second;
    increasing a read latency and a write latency; and
    adjusting a level of data reliability.

8. A system comprising:
    a service level agreement monitoring module comprising one or more processors to:
    calculate service level agreement performance data based on a time delay between communicating a request to a storage server and receiving a response from the storage server at a data storage consumer; and
    detect a service level agreement violation of a service level agreement, based on the service level agreement performance data;
    a balancing module comprising one or more processors to:
    throttle data storage server resources to maintain the service level agreement of the data storage consumer based on the service level agreement performance data indicating the service level agreement violation.

9. The system of claim 8, wherein the service level agreement monitoring module is further configured to issue an alert ticket responsive to detecting the service level agreement violation.

10. The system of claim 9, wherein the alert ticket includes an indication of the service level agreement violation and the service level agreement performance data.

11. The system of claim 9, wherein the issuing the alert ticket by the service level agreement module further comprises:
    causing display of a violation notification at the data storage consumer, the violation notification including an indication of a time when the service level agreement violation occurred.

12. The system of claim 9, wherein the alert ticket indicates an amount and a type of resource to throttle to maintain the service level agreement.

13. The system of claim 8, wherein the throttling the data storage server resources by the balancing module comprises:
    limiting a read per second and a write per second;
    increasing a read latency and a write latency; and
    adjusting a level of data reliability.

14. The system of claim 8, wherein the one or more processors of the service level agreement monitoring module are further configured to:
    monitor the service level agreement performance data over a predefined period;

calculate a usage trend based on the service level agreement performance data over the predefined period;

detect a potential violation of the service level agreement based on the usage trend over the predefined period; and issue an alert ticket based on the potential violation.

15. The system of claim 14, wherein the alert ticket issued by the service level agreement monitoring module indicates the potential violation of the service level agreement.

16. The system of claim 8, wherein the throttling the data storage server resources comprises:

limiting a read per second and a write per second;
increasing a read latency and a write latency; and
adjusting a level of data reliability.

17. A non-transitory machine-readable medium comprising stored instruction, wherein the instructions, when executed, cause a machine to perform operation comprising:

calculating service level agreement performance data, based on a time delay between communicating a request to a storage server and receiving a response from the storage server at a data storage consumer;

detecting a service level agreement violation of a service level agreement, based on the service level agreement performance data; and throttling data storage server resources to maintain the service level agreement of the data storage consumer based on the service level agreement performance data indicating the service level agreement violation.

18. The non-transitory machine-readable medium of claim 17, wherein the instructions, when executed, cause a machine to perform operations further comprising:

issuing an alert ticket responsive to detecting the service level agreement violation.

19. The non-transitory machine-readable medium of claim 17, wherein the instructions, when executed, cause a machine to perform operations further comprising:

monitoring the service level agreement performance data over a predefined period;

calculating a usage trend based on the service level agreement performance data over the predefined period;

detecting a potential violation of the service level agreement based on the usage trend over the predefined period; and issuing an alert ticket based on the potential violation.

20. The non-transitory machine-readable medium of claim 17, wherein the alert ticket indicate the potential violation of the service level agreement.

* * * * *